(12) United States Patent
Yeh

(10) Patent No.: US 10,551,597 B2
(45) Date of Patent: Feb. 4, 2020

(54) TELEPHOTO LENS ASSEMBLY

(71) Applicants: Sintai Optical (Shenzhen) Co., Ltd., ShenZhen, Guandong Province (CN); Asia Optical Co., Inc., Taichung (TW)

(72) Inventor: Ching-Chung Yeh, Taichung (TW)

(73) Assignees: SINTAI OPTICAL (SHENZHEN) CO., LTD., Shenzhen, Guandong Province (CN); ASIA OPTICAL CO., INC., Taichung (TW)

( * ) Notice: Subject to any disclaimer, the term of this patent is extended or adjusted under 35 U.S.C. 154(b) by 0 days.

(21) Appl. No.: 15/854,959

(22) Filed: Dec. 27, 2017

(65) Prior Publication Data

US 2018/0321472 A1   Nov. 8, 2018

(30) Foreign Application Priority Data

May 3, 2017   (CN) .......................... 2017 1 0303277

(51) Int. Cl.
| | |
|---|---|
| *G02B 3/02* | (2006.01) |
| *G02B 13/02* | (2006.01) |
| *G02B 13/00* | (2006.01) |
| *G02B 9/62* | (2006.01) |
| *G02B 9/60* | (2006.01) |

(52) U.S. Cl.
CPC ............... *G02B 13/02* (2013.01); *G02B 9/62* (2013.01); *G02B 13/0045* (2013.01); *G02B 9/60* (2013.01)

(58) Field of Classification Search
CPC ...................................... G02B 13/02
USPC ......................................... 359/713
See application file for complete search history.

(56) References Cited

U.S. PATENT DOCUMENTS

2010/0238561 A1* 9/2010 Nakagawa ........... G02B 15/173
                                                    359/683
2011/0317285 A1* 12/2011 Ohashi ..................... G02B 9/64
                                                    359/753

* cited by examiner

*Primary Examiner* — James C. Jones
(74) *Attorney, Agent, or Firm* — McClure, Qualey & Rodack, LLP

(57) ABSTRACT

A telephoto lens assembly comprises sequentially from an object side to an image side along an optical axis a first lens, a second lens, a stop, a third lens, a fourth lens, a fifth lens and a sixth lens. The first lens has negative refractive power and includes a convex surface facing the object side. The second lens has negative refractive power and includes a convex surface facing the image side. The third lens has positive refractive power. The fourth lens has refractive power. The fifth lens has refractive power. The sixth lens has positive refractive power. The fourth lens and the fifth lens are cemented.

19 Claims, 12 Drawing Sheets

TELEPHOTO LENS ASSEMBLY

BACKGROUND OF THE INVENTION

Field of the Invention

The invention relates to a telephoto lens assembly.

Description of the Related Art

The well-known telephoto lens assembly with six lenses usually has longer overall length. Because of this reason, the telephoto lens assembly is difficult to meet the requirement of miniaturization. Furthermore, the conventional telephoto lens assembly also has a problem on field brightness. The brightness at a circumferential edge is much lower than that at the center area. Therefore, a telephoto lens assembly needs a new structure in order to enhance the characteristics described above and meet the requirement of the present.

BRIEF SUMMARY OF THE INVENTION

The invention provides a telephoto lens assembly to solve the above problems. The telephoto lens assembly is provided with characteristics of miniaturization and high field brightness, and still has good optical performance and resolution.

The telephoto lens assembly in accordance with the invention in sequence from an object side to an image side along an optical axis, comprises a first lens which is a meniscus lens with negative refractive power; a second lens which is a meniscus lens with negative refractive power; a stop; a third lens with positive refractive power; a fourth lens with refractive power; a fifth lens with refractive power; a sixth lens with positive refractive power, and the fourth lens and the fifth lens are cemented together to form a cemented lens.

The telephoto lens assembly in accordance with the invention in sequence from an object side to an image side along an optical axis, comprises a first lens which is a meniscus lens with negative refractive power; a second lens which is a meniscus lens with negative refractive power; a stop; a third lens with positive refractive power; a fourth lens with positive refractive power which includes a concave surface facing the image side; a fifth lens with negative refractive power which includes a convex surface facing the object side, and a sixth lens with positive refractive power.

In accordance with the invention, the first lens includes a convex surface facing the object side and a concave surface facing the image side, and the second lens includes a concave surface facing the object side and a convex surface facing the image side.

In accordance with the invention, the telephoto lens assembly satisfies $-0.7 \text{ mm}^{-1} \leq 1/(Nd_1 \times f_1) + 1/(Nd_2 \times f_2) + 1/(Nd_3 \times f_3) + 1/(Nd_4 \times f_4) + 1/(Nd_5 \times f_5) + 1/(Nd_6 \times f_6) \leq 0.7 \text{ mm}^{-1}$, wherein $Nd_1$ is an index of refraction of the first lens, $Nd_2$ is an index of refraction of the second lens, $Nd_3$ is an index of refraction of the third lens, $Nd_4$ is an index of refraction of the fourth lens, $Nd_5$ is an index of refraction of the fifth lens, $Nd_6$ is an index of refraction of the sixth lens, $f_1$ is an effective focal length of the first lens, $f_2$ is an effective focal length of the second lens, $f_3$ is an effective focal length of the third lens, $f_4$ is an effective focal length of the fourth lens, $f_5$ is an effective focal length of the fifth lens and $f_6$ is an effective focal length of the sixth lens.

In accordance with the invention, the sixth lens is an aspheric lens.

In accordance with the invention, the telephoto lens assembly satisfies $0.4 \leq LR_1/f \leq 0.8$, wherein $LR_1$ is a radius of the object-side surface of the first lens and f is an effective focal length of the telephoto lens assembly.

In accordance with the invention, the telephoto lens assembly satisfies $0.2 \leq f/TTL \leq 0.45$, wherein f is an effective focal length of the telephoto lens assembly and TTL is total track length which is from the object side of the first lens to the image side along an optical axis.

In accordance with the invention, the telephoto lens assembly satisfies $23 \leq Vd_4 - Vd_5 \leq 40$, wherein $Vd_4$ is an Abbe number of the fourth lens and $Vd_5$ is an Abbe number of the fifth lens.

In accordance with the invention, the telephoto lens assembly satisfies $|f_4/f_5| \leq 1.7$, wherein $f_4$ is an effective focal length of the fourth lens and $f_5$ is an effective focal length of the fifth lens.

In accordance with the invention, the telephoto lens assembly satisfies $0.05 < |d_2/d_1| < 1$, wherein $d_2$ is a distance from a cross point to a center point of object-side surface of the first lens, $d_1$ is a distance from the cross point to the image side along the optical axis, the cross point is defined as the line of intersection formed between a line which is between two opposite engaging point of the first lens and the optical axis.

In accordance with the invention, the first lens is made of glass material, the second lens is made of glass material, the third lens is made of glass material, the fourth lens is made of glass material, the fifth lens is made of glass material and the sixth lens is made of glass material.

The telephoto lens assembly in accordance with the invention in sequence from an object side to an image side along an optical axis, comprises a first lens with negative refractive power which includes a convex surface facing the object side; a second lens with negative refractive power which includes a concave surface facing the object side and a convex surface facing the image side; a third lens which is a biconvex lens with positive refractive power; a fourth lens with positive refractive power which includes a convex surface facing the object side; a fifth lens with negative refractive power which includes a convex surface facing the object side; a sixth lens which is a biconvex lens with positive refractive power; the fourth lens and the fifth lens are cemented together to form a cemented lens; the telephoto lens assembly satisfies the following condition:

$$-0.7 \text{ mm}^{-1} \leq 1/(Nd_1 \times f_1) + 1/(Nd_2 \times f_2) + 1/(Nd_3 \times f_3) + 1/(Nd_4 \times f_4) + 1/(Nd_5 \times f_5) + 1/(Nd_6 \times f_6) \leq 0.7 \text{ mm}^{-1},$$

$$0.4 \leq LR_1/f \leq 0.8, \ 0.2 \leq f/TTL \leq 0.45, \ 23 \leq Vd_4 - Vd_5 \leq 40, \ |f_4/f_5| \geq 1.7,$$

$$0.05 < |d_2/d_1| < 1,$$

wherein $Nd_1$ is an index of refraction of the first lens, $Nd_2$ is an index of refraction of the second lens, $Nd_3$ is an index of refraction of the third lens, $Nd_4$ is an index of refraction of the fourth lens, $Nd_5$ is an index of refraction of the fifth lens, $Nd_6$ is an index of refraction of the sixth lens, $f_1$ is an effective focal length of the first lens, $f_2$ is an effective focal length of the second lens, $f_3$ is an effective focal length of the third lens, $f_4$ is an effective focal length of the fourth lens, $f_5$ is an effective focal length of the fifth lens, $f_6$ is an effective focal length of the sixth lens, $LR_1$ is a radius of the object-side surface of the first lens, f is an effective focal length of the telephoto lens assembly, TTL is total track length which is from the object side of the first lens to the image side along an optical axis, $Vd_4$ is an Abbe number of the fourth lens, $Vd_5$ is an Abbe number of the fifth lens, $d_2$ is a distance from a cross point to a center point of object-side surface of the first lens, $d_1$ is a distance from the cross point to the image side along the optical axis, the cross point is defined as the line of intersection formed between a line which is between two opposite engaging point of the first lens and the optical axis.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The following description is made for the purpose of illustrating the general principles of the invention and should not be taken in a limiting sense. The scope of the invention is best determined by reference to the appended claims.

Figure 1:
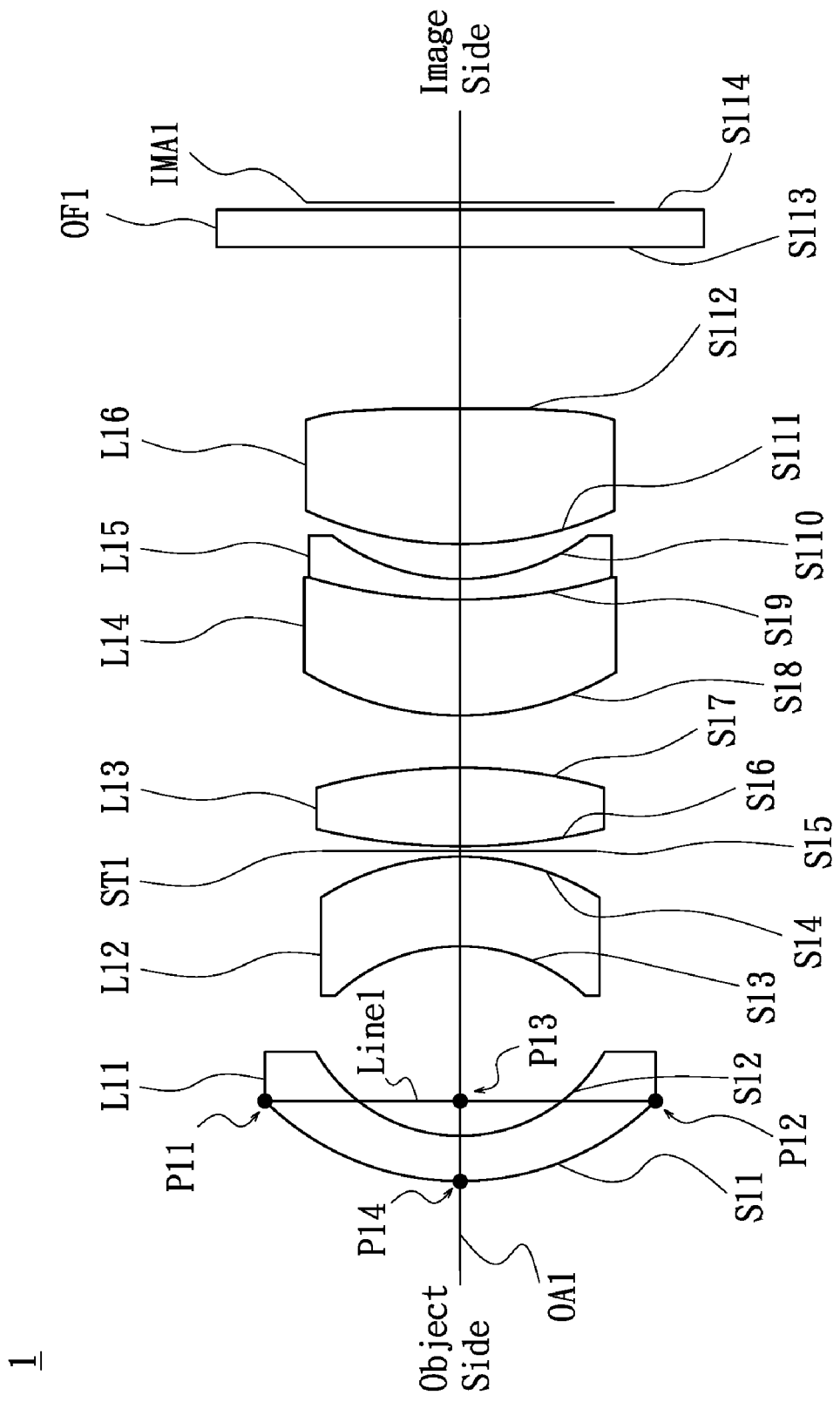
FIG. 1 is a lens layout and optical path diagram of a telephoto lens assembly in accordance with a first embodiment of the invention.

Referring to FIG. 1, FIG. 1 is a lens layout and optical path diagram of a telephoto lens assembly in accordance with a first embodiment of the invention. The telephoto lens assembly 1 includes a first lens L11, a second lens L12, a stop ST1, a third lens L13, a fourth lens L14, a fifth lens L15, a sixth lens L16 and an optical filter OF1, all of which are arranged in sequence from an object side to an image side along an optical axis OA1. In operation, an image of light rays from the object side is formed on an image plane IMA1.

The first lens L11 is a meniscus lens with negative refractive power. The first lens L11 is made of glass material, wherein the object side surface S11 is a convex surface, the image side surface S12 is a concave surface and both of the object side surface S11 and image side surface S12 are spherical surfaces.

The second lens L12 is a meniscus lens with negative refractive power. The second lens L12 is made of glass material, wherein the object side surface S13 is a concave surface, the image side surface S14 is a convex surface and both of the object side surface S13 and image side surface S14 are spherical surfaces.

The third lens L13 is a biconvex lens with positive refractive power. The third lens L13 is made of glass material, wherein the object side surface S16 is a convex surface, the image side surface S17 is a convex surface and both of the object side surface S16 and image side surface S17 are spherical surfaces.

The fourth lens L14 is a meniscus lens with positive refractive power. The fourth lens L14 is made of glass material, wherein the object side surface S18 is a convex surface, the image side surface S19 is a concave surface and both of the object side surface S18 and image side surface S19 are spherical surfaces.

The fifth lens L15 is a meniscus lens with negative refractive power. The fifth lens L15 is made of glass material, wherein the object side surface S19 is a convex surface, the image side surface S110 is a concave surface and both of the object side surface S19 and image side surface S110 are spherical surfaces.

The sixth lens L16 is a biconvex lens with positive refractive power. The sixth lens L16 is made of glass material, wherein the object side surface S111 is a convex surface, the image side surface S112 is a convex surface and both of the object side surface S111 and image side surface S112 are aspheric surfaces.

Both of the object side surface S113 and image side surface S114 of the optical filter OF1 are plane surfaces.

In addition, the telephoto lens assembly 1 of the first embodiment at least satisfies one of the following conditions:

$$-0.7 \text{ mm}^{-1} \leq 1/(Nd1_1 \times f1_1) + 1/(Nd1_2 \times f1_2) + 1/(Nd1_3 \times f1_3) + 1/(Nd1_4 \times f1_4) + 1/(Nd1_5 \times f1_5) + 1/(Nd1_6 \times f1_6) \leq 0.7 \text{ mm}^{-1} \quad (1)$$

$$0.4 \leq LR1_1/f1 \leq 0.8 \quad (2)$$

$$0.2 \leq f1/TTL1 \leq 0.45 \quad (3)$$

$$23 \leq Vd1_4 - V1_5 \leq 40 \quad (4)$$

$$|f1_4/f1_5| \geq 1.7 \quad (5)$$

$$0.05 < |d1_2/d1_1| < 1 \quad (6)$$

wherein $Nd1_1$ is an index of refraction of the first lens L11, $Nd1_2$ is an index of refraction of the second lens L12, $Nd1_3$ is an index of refraction of the third lens L13, $Nd1_4$ is an index of refraction of the fourth lens L14, $Nd1_5$ is an index of refraction of the fifth lens L15, $Nd1_6$ is an index of refraction of the sixth lens L16, $f1_1$ is an effective focal length of the first lens L11, $fl_2$ is an effective focal length of the second lens L12, $fl_3$ is an effective focal length of the third lens L13, $fl_4$ is an effective focal length of the fourth lens L14, $fl_5$ is an effective focal length of the fifth lens L15, $fl_6$ is an effective focal length of the sixth lens L16, fl is an effective focal length of the telephoto lens assembly 1, $LR1_1$ is a radius of the object-side surface of the first lens L11, TTL1 is total track length which is from the object side S11 of the first lens L11 to the image side IMA1 along the optical axis OA1, $Vdl_4$ is an Abbe number of the fourth lens L14, $Vdl_5$ is an Abbe number of the fifth lens L15, $dl_2$ is a distance from a cross point P13 to a center point P14 of object-side surface of the first lens L11, $dl_1$ is a distance from the cross point P13 to the image side IMA1 along the optical axis OA1, the cross point P13 is defined as the line of intersection formed between a line Line1 which is between two opposite engaging point P11, P12 of the first lens L11 and the optical axis OA1.

By the above design of the lenses and stop ST1, the telephoto lens assembly 1 is provided with characteristics of a short total track length, a small F number, a field brightness of the telephoto lens assembly can be increased and an aberration that can be corrected effectively.

The telephoto lens assembly 1 in accordance with the FIG. 1 is provided with the optical specifications shown in Table 1. Table 1 shows that the effective focal length is equal to 5.91 mm, F-number is equal to 1.637 and total lens length is equal to 20.45 mm for the telephoto lens assembly 1 of the first embodiment of the invention.

TABLE 1

Effective Focal Length = 5.91 mm
F-number = 1.637
Total Lens Length = 20.45 mm

| Surface Number | Radius of Curvature (mm) | Thickness (mm) | Nd | Vd | Remark |
|---|---|---|---|---|---|
| S11 | 5.58 | 0.945 | 1.52 | 65 | The First Lens L11 |
| S12 | 3.39 | 4.005 | | | |
| S13 | −3.61 | 1.88 | 1.90 | 35 | The Second Lens L12 |
| S14 | −4.90 | 0.1 | | | |
| S15 | ∞ | 0.085 | | | Stop ST1 |
| S16 | 12.41 | 1.646 | 1.52 | 80 | The Third Lens L13 |
| S17 | −9.71 | 1.082 | | | |
| S18 | 5.89 | 2.453 | 1.78 | 50 | The fourth lens L14 |
| S19 | 10.46 | 0.419 | 1.94 | 18 | The fifth lens L15 |
| S110 | 4.17 | 0.734 | | | |
| S111 | 6.33 | 2.832 | 1.68 | 54 | The sixth lens L16 |
| S112 | −46.94 | 3.368 | | | |
| S113 | ∞ | 0.8 | 1.52 | 54.5 | Optical Filter OF1 |
| S114 | ∞ | 0.1 | | | |

The aspheric surface sag z of each lens in table 1 can be calculated by the following formula:

$$z = ch^2 / \{1 + [1-(k+1)c^2h^2]^{1/2}\} + Ah^4 + Bh^6 + Ch^8 + Dh^{10}$$

where c is curvature, h is the vertical distance from the lens surface to the optical axis, k is conic constant and A, B, C and D are aspheric coefficients.

In the first embodiment, the conic constant k and the aspheric coefficients A, B, C, D of each surface are shown in Table 2.

TABLE 2

| Surface Number | k | A | B | C | D |
|---|---|---|---|---|---|
| S111 | −0.215 | −4.01E−04 | −2.00E−05 | −1.22E−05 | 2.982E−07 |
| S112 | −170 | 1.892E−06 | −1.04E−04 | −2.94E−06 | −2.23E−07 |

Table 3 lists some parameter and calculated values of the above condition (1)-(6). According to the Table 3, the telephoto lens assembly 1 of the first embodiment satisfies the above conditions (1)-(6).

TABLE 3

| | | | | | |
|---|---|---|---|---|---|
| $fl_1$ | −19.487 mm | $fl_2$ | −49.022 mm | $fl_3$ | 10.723 mm |
| $fl_4$ | 13.922 mm | $fl_5$ | −7.547 mm | $fl_6$ | 8.359 mm |
| fl | 5.91 mm | TTL1 | 20.45 mm | $Ndl_1$ | 1.52 |
| $Ndl_2$ | 1.90 | $Ndl_3$ | 1.52 | $Ndl_4$ | 1.78 |
| $Ndl_5$ | 1.94 | $Ndl_6$ | 1.68 | $LR1_1$ | 4 mm |
| $Vdl_4$ | 50 | $Vdl_5$ | 18 | $dl_1$ | 19.012 mm |
| $dl_2$ | 1.44 mm | | | | |
| $1/(Ndl_1 \times fl_1) + 1/(Ndl_2 \times fl_2) + 1/(Ndl_3 \times fl_3) + 1/(Ndl_4 \times fl_4) + 1/(Ndl_5 \times fl_5) + 1/(Ndl_6 \times fl_6)$ | | | | | 0.060 mm$^{-1}$ |
| $LR1_1/fl$ | 0.68 | fl/TTL1 | 0.289 | $Vdl_4 - Vdl_5$ | 32 |
| $|fl_4/fl_5|$ | 1.845 | $|dl_2/dl_1|$ | 0.076 | | |

In the first embodiment, the fourth lens L14 and the fifth lens L15 are cemented together to form a cemented lens. A composite focal length of the cemented lens is −30.391 mm. The cemented lens has negative refractive power and includes a convex surface facing the object side and a concave surface facing the image side. The cemented lens of the fourth lens L14 with positive refractive power and the fifth lens L15 with negative refractive power can effectively correct chromatic aberration and is of benefit to get a balance between reduce aberration and short total track length. Furthermore, the tolerance sensitivity of the cemented lens is not affected by air space between the lenses. The cemented is of benefit to enhance the environmental resistance ability and optical performance stability of the telephoto lens assembly.

Figure 2A:
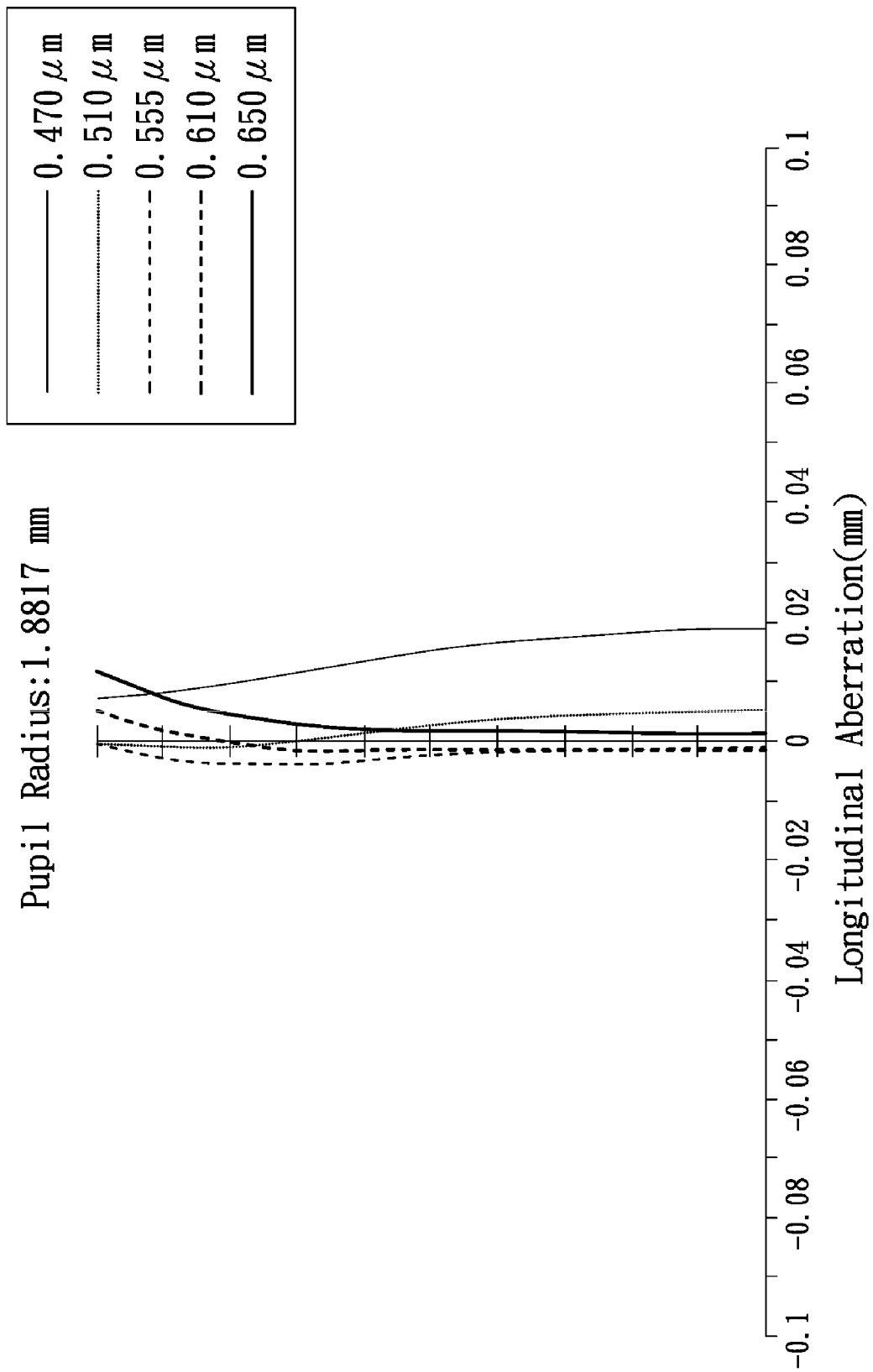
FIG. 2A is a longitudinal spherical aberration diagram of the telephoto lens assembly in accordance with the FIG. 1.
Figure 2B:
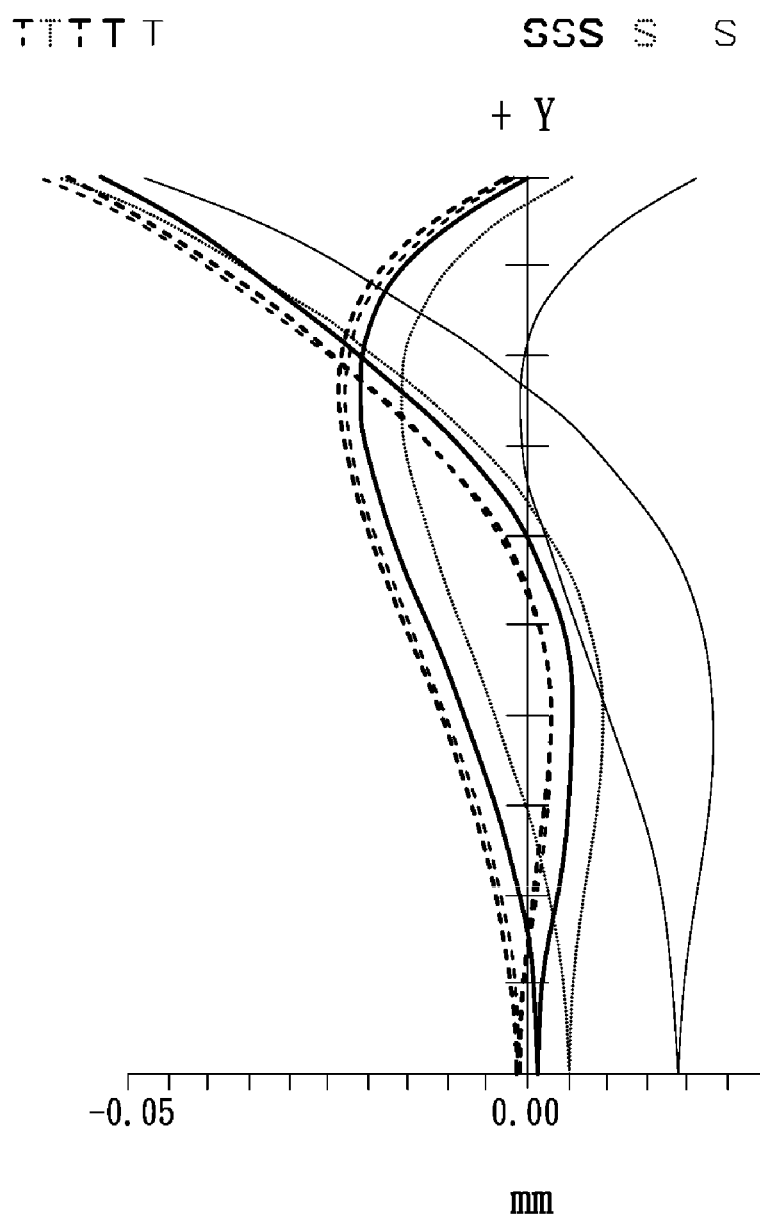
FIG. 2B is an astigmatic field curves diagram of the telephoto lens assembly in accordance with the FIG. 1.
Figure 2C:
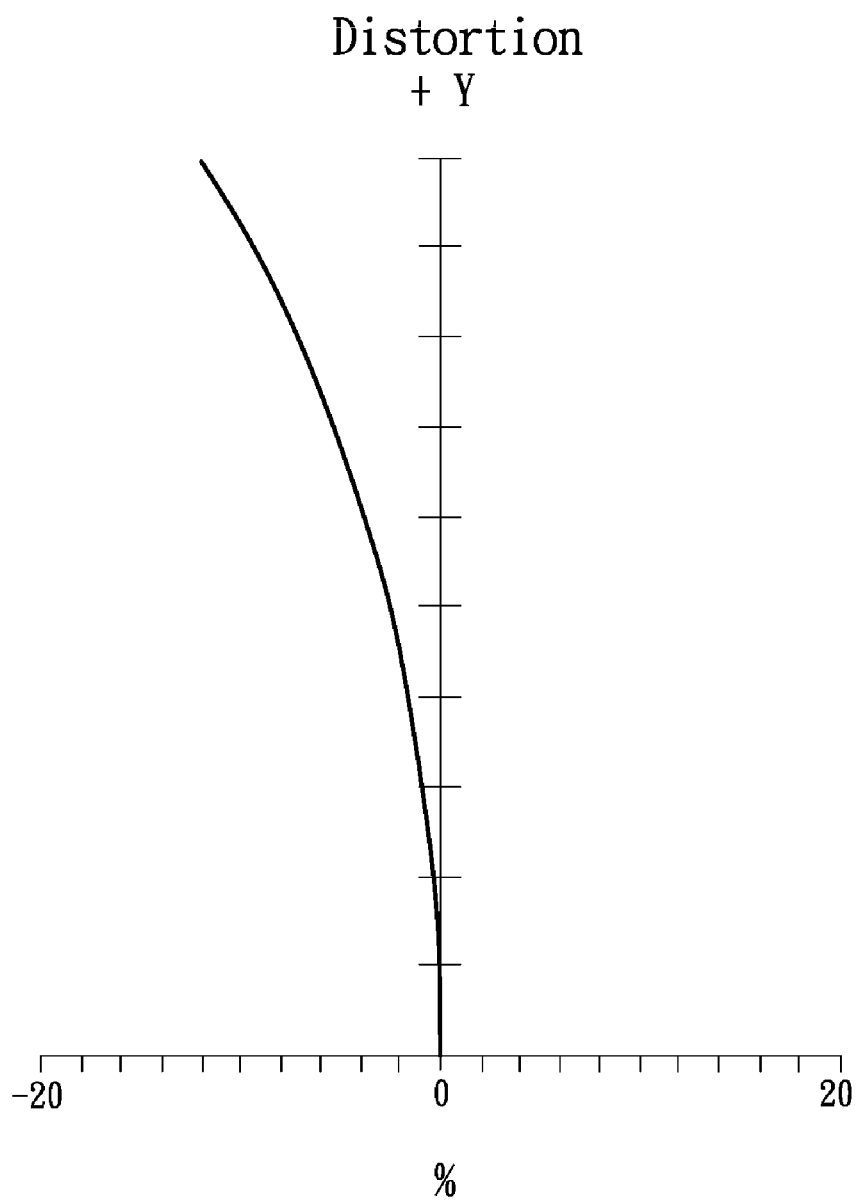
FIG. 2C is a distortion diagram of the telephoto lens assembly in accordance with the FIG. 1.

By the above arrangements of the lenses and stop ST1, the telephoto lens assembly 1 of the first embodiment can meet the requirements of optical performance as seen in FIGS. 2A-2C, wherein FIG. 2A shows a longitudinal aberration diagram of the telephoto lens assembly 1 in accordance with the first embodiment of the invention, FIG. 2B shows an astigmatic field curves diagram of the telephoto lens assembly 1 in accordance with the first embodiment of the invention and FIG. 2C shows a distortion diagram of the telephoto lens assembly 1 in accordance with the first embodiment of the invention.

It can be seen from FIG. 2A that the longitudinal aberration in the telephoto lens assembly 1 of the first embodiment ranges from −0.005 mm to 0.02 mm for the wavelength of 0.470 μm, 0.510 μm, 0.555 μm, 0.610 μm and 0.650 μm.

It can be seen from FIG. 2B that the astigmatic field curves of tangential direction and sagittal direction in the telephoto lens assembly 1 of the first embodiment ranges between −0.065 mm and 0.025 mm for the wavelength of 0.470 μm, 0.510 μm, 0.555 μm, 0.610 μm and 0.650 μm.

It can be seen from FIG. 2C (in which the five lines in the figure almost coincide to appear as if a signal line) that the distortion in the telephoto lens assembly 1 of the first embodiment ranges between −13% and 0% for the wavelength of 0.470 μm, 0.510 μm, 0.555 μm, 0.610 μm and 0.650 μm.

It is obvious that the longitudinal aberration, astigmatic field curves and the distortion of the telephoto lens assembly 1 of the first embodiment can be corrected effectively. Therefore, the telephoto lens assembly 1 of the first embodiment is capable of good optical performance.

Figure 3:
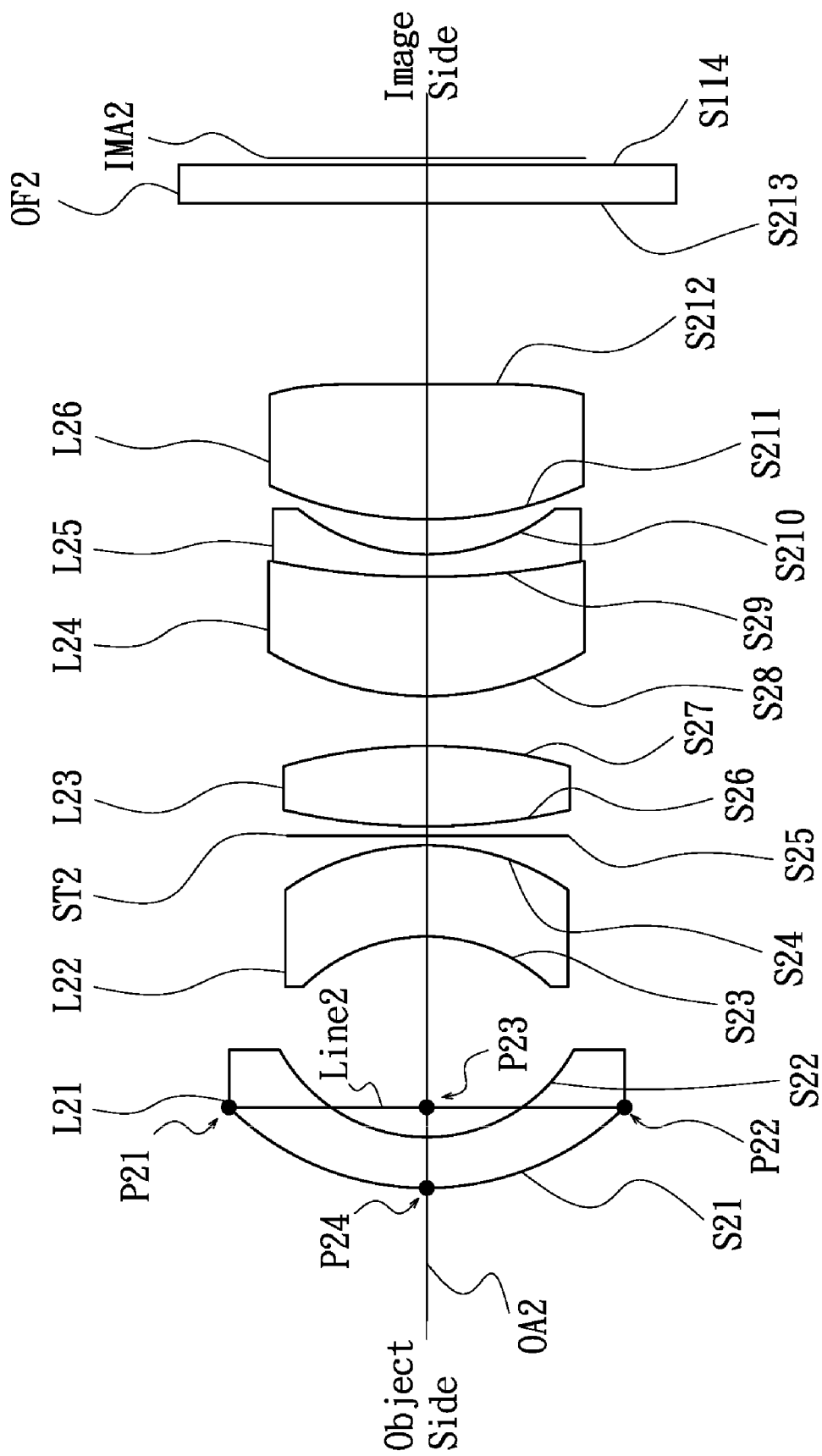
FIG. 3 is a lens layout and optical path diagram of a telephoto lens assembly in accordance with a second embodiment of the invention.

Referring to FIG. 3, FIG. 3 is a lens layout and optical path diagram of a telephoto lens assembly in accordance with a second embodiment of the invention. The telephoto lens assembly 2 includes a first lens L21, a second lens L22, a stop ST2, a third lens L23, a fourth lens L24, a fifth lens L25, a sixth lens L26 and an optical filter OF2, all of which are arranged in sequence from an object side to an image side along an optical axis OA2. In operation, an image of light rays from the object side is formed on an image plane IMA2.

The first lens L21 is a meniscus lens with negative refractive power. The first lens L21 is made of glass material, wherein the object side surface S21 is a convex surface, the image side surface S22 is a concave surface and both of the object side surface S21 and image side surface S22 are spherical surfaces.

The second lens L22 is a meniscus lens with negative refractive power. The second lens L22 is made of glass material, wherein the object side surface S23 is a concave surface, the image side surface S24 is a convex surface and both of the object side surface S23 and image side surface S24 are spherical surfaces.

The third lens L23 is a biconvex lens with positive refractive power. The third lens L23 is made of glass material, wherein the object side surface S26 is a convex surface, the image side surface S27 is a convex surface and both of the object side surface S26 and image side surface S27 are spherical surfaces.

The fourth lens L24 is a meniscus lens with positive refractive power. The fourth lens L24 is made of glass material, wherein the object side surface S28 is a convex surface, the image side surface S29 is a concave surface and both of the object side surface S28 and image side surface S29 are spherical surfaces.

The fifth lens L25 is a meniscus lens with negative refractive power. The fifth lens L25 is made of glass material, wherein the object side surface S29 is a convex surface, the image side surface S210 is a concave surface and both of the object side surface S29 and image side surface S210 are spherical surfaces.

The sixth lens L26 is a biconvex lens with positive refractive power. The sixth lens L26 is made of glass material, wherein the object side surface S211 is a convex surface, the image side surface S212 is a convex surface and both of the object side surface S211 and image side surface S212 are aspheric surfaces.

Both of the object side surface S213 and image side surface S214 of the optical filter OF2 are plane surfaces.

In addition, the telephoto lens assembly 2 of the second embodiment at least satisfies one of the following conditions:

$$-0.7 \text{ mm}^{-1} \leq 1/(Nd2_1 \times f2_1) + 1/(Nd2_2 \times f2_2) + 1/(Nd2_3 \times f2_3) + 1/(Nd2_4 \times f2_4) + 1/(Nd2_5 \times f2_5) + 1/(Nd2_6 \times f2_6) \leq 0.7 \text{ mm}^{-1} \quad (7)$$

$$0.4 \leq LR2_1/f2 \leq 0.8 \quad (8)$$

$$0.2 \leq f2/TTL2 \leq 0.45 \quad (9)$$

$$23 \leq Vd2_4 - Vd2_5 \leq 40 \quad (10)$$

$$|f2_4/f2_5| \geq 1.7 \quad (11)$$

$$0.05 < |d2_2/d2_1| < 1 \quad (12)$$

wherein $Nd2_1$ is an index of refraction of the first lens L21, $Nd2_2$ is an index of refraction of the second lens L22, $Nd2_3$ is an index of refraction of the third lens L23, $Nd2_4$ is an index of refraction of the fourth lens L24, $Nd2_5$ is an index of refraction of the fifth lens L25, $Nd2_6$ is an index of refraction of the sixth lens L26, $f2_1$ is an effective focal length of the first lens L21, $f2_2$ is an effective focal length of the second lens L22, $f2_3$ is an effective focal length of the third lens L23, $f2_4$ is an effective focal length of the fourth lens L24, $f2_5$ is an effective focal length of the fifth lens L25, $f2_6$ is an effective focal length of the sixth lens L26, f2 is an effective focal length of the telephoto lens assembly 2, $LR2_1$ a radius of the object-side surface of the first lens L21, TTL2 is total track length which is from the object side S21 of the first lens L21 to the image side IMA2 along an optical axis OA2, $Vd2_4$ is an Abbe number of the fourth lens L24, $Vd2_5$ is an Abbe number of the fifth lens L25, $d2_2$ is a distance from a cross point P23 to a center point P24 of object-side surface of the first lens L21, $d2_1$ is a distance from the cross point P23 to the image side IMA2 along the optical axis OA2, the cross point P23 is defined as the line of intersection formed between a line Line2 which is between two opposite engaging point P21, P22 of the first lens L21 and the optical axis OA2.

By the above design of the lenses and stop ST2, the telephoto lens assembly 2 is provided with characteristics of a short total track length, a small F number, a field brightness of the telephoto lens assembly can be increased and an aberration that can be corrected effectively.

The telephoto lens assembly 2 in accordance with the FIG. 3 is provided with the optical specifications shown in Table 4. Table 4 shows that the effective focal length is equal to 6.08 mm, F-number is equal to 1.672 and total lens length is equal to 20.72 mm for the telephoto lens assembly 2 of the second embodiment of the invention.

TABLE 4

Effective Focal Length = 6.08 mm
F-number = 1.672
Total Lens Length = 20.72 mm

| Surface Number | Radius of Curvature (mm) | Thickness (mm) | Nd | Vd | Remark |
|---|---|---|---|---|---|
| S21 | 5.66 | 1.033 | 1.50 | 66 | The First Lens L21 |
| S22 | 3.40 | 4.029 | | | |
| S23 | −3.61 | 1.866 | 1.88 | 35 | The Second Lens L22 |
| S24 | −4.88 | 0.157 | | | |
| S25 | ∞ | 0.181 | | | Stop ST2 |
| S26 | 12.30 | 1.645 | 1.51 | 78 | The Third Lens L23 |
| S27 | −9.62 | 0.972 | | | |
| S28 | 5.88 | 2.449 | 1.79 | 58 | The fourth lens L24 |
| S29 | 14.89 | 0.415 | 1.94 | 22 | The fifth lens L25 |
| S210 | 4.16 | 0.726 | | | |
| S211 | 6.32 | 2.735 | 1.67 | 56 | The sixth lens L26 |
| S212 | −50.27 | 3.609 | | | |
| S213 | ∞ | 0.8 | 1.52 | 54.5 | Optical Filter OF2 |
| S214 | ∞ | 0.1 | | | |

The aspheric surface sag z of each lens in table 4 can be calculated by the following formula:

$$z = ch^2/\{1+[1-(k+1)c^2h^2]^{1/2}\}+Ah^4+Bh^6+Ch^8+Dh^{10}$$

where c is curvature, h is the vertical distance from the lens surface to the optical axis, k is conic constant and A, B, C and D are aspheric coefficients.

In the second embodiment, the conic constant k and the aspheric coefficients A, B, C, D of each surface are shown in Table 5.

TABLE 5

| Surface Number | k | A | B | C | D |
|---|---|---|---|---|---|
| S211 | −0.191 | −3.827E−04 | −2.211E−05 | −1.24E−05 | 3.623E−07 |
| S212 | −173.83 | −1.402E−06 | −1.023E−04 | −2.825E−06 | −2.334E−07 |

Table 6 lists some parameter and calculated values of the above condition (7)-(12). According to the Table 6, the telephoto lens assembly 2 of the second embodiment satisfies the above conditions (7)-(12).

TABLE 6

| | | | | | |
|---|---|---|---|---|---|
| $f2_1$ | −20.018 mm | $f2_2$ | −50.986 mm | $f2_3$ | 10.834 mm |
| $f2_4$ | 10.956 mm | $f2_5$ | −6.212 mm | $f2_6$ | 8.515 mm |
| f2 | 6.08 mm | TTL2 | 20.72 mm | $Nd2_1$ | 1.50 |
| $Nd2_2$ | 1.88 | $Nd2_3$ | 1.51 | $Nd2_4$ | 1.79 |
| $Nd2_5$ | 1.94 | $Nd2_6$ | 1.67 | $LR2_1$ | 4 mm |
| $Vd2_4$ | 58 | $Vd2_5$ | 22 | $d2_1$ | 19.286 mm |
| $d2_2$ | 1.435 mm | | | | |
| $1/(Nd2_1 \times f2_1) + 1/(Nd2_2 \times f2_2) + 1/(Nd2_3 \times f2_3) + 1/(Nd2_4 \times f2_4) + 1/(Nd2_5 \times f2_5) + 1/(Nd2_6 \times f2_6)$ | | | | 0.056 mm$^{-1}$ | |
| $LR2_1/f2$ | 0.66 | f2/TTL2 | 0.293 | $Vd2_4 − Vd2_5$ | 36 |
| $|f2_4/f2_5|$ | 1.764 | $|d2_2/d2_1|$ | 0.074 | | |

In the second embodiment, the fourth lens L24 and the fifth lens L25 are cemented together to form a cemented lens. A composite focal length of the cemented lens is −28.054 mm. The cemented lens has negative refractive power and includes a convex surface facing the object side and a concave surface facing the image side. The cemented lens of the fourth lens L24 with positive refractive power and the fifth lens L25 with negative refractive power can effectively correct chromatic aberration and is of benefit to get a balance between reduce aberration and short total track length. Furthermore, the tolerance sensitivity of the cemented lens is not affected by air space between the lenses. The cemented is of benefit to enhance the environmental resistance ability and optical performance stability of the telephoto lens assembly.

Figure 4A:
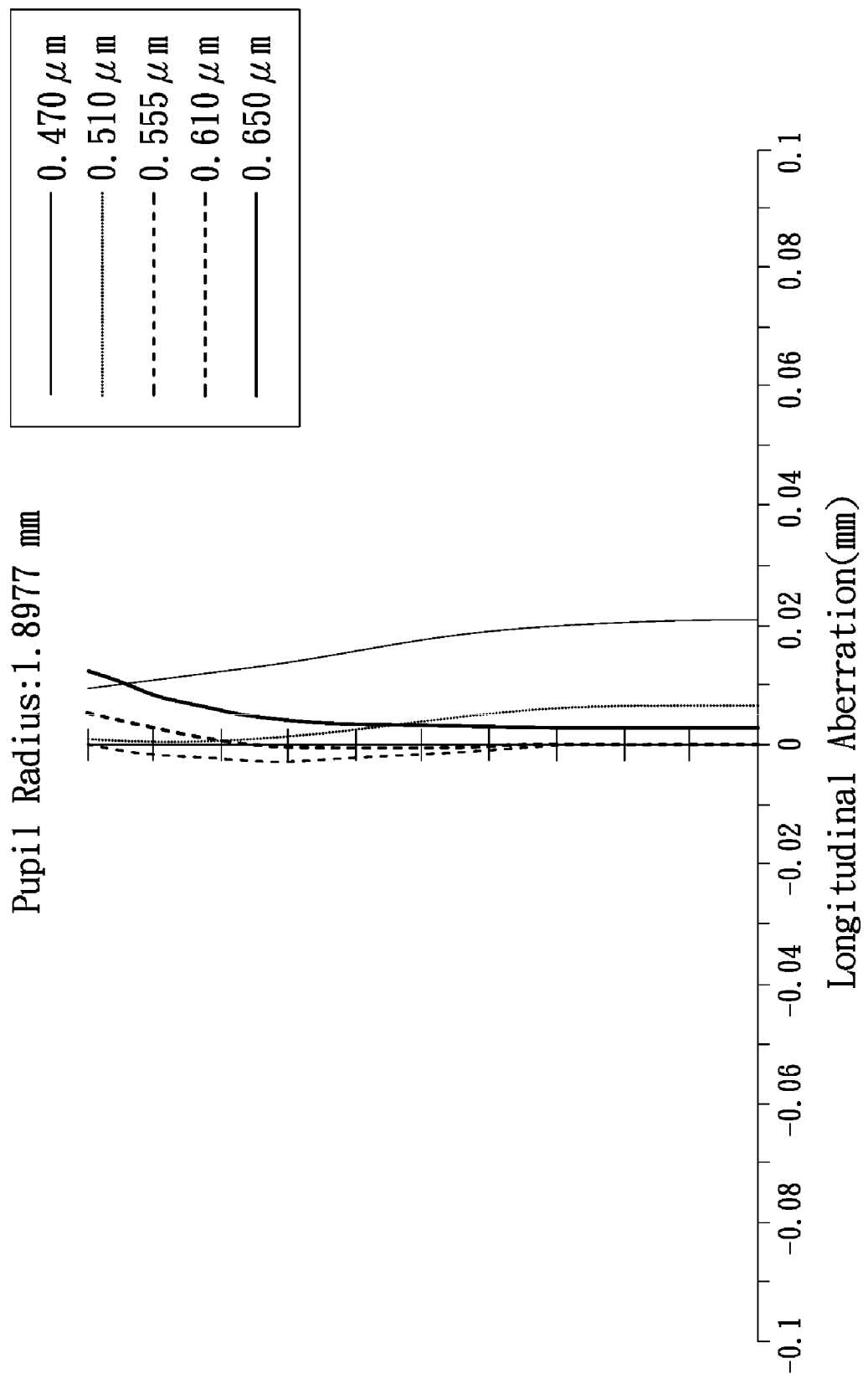
FIG. 4A is a longitudinal spherical aberration diagram of the telephoto lens assembly in accordance with the second embodiment of the invention.
Figure 4B:
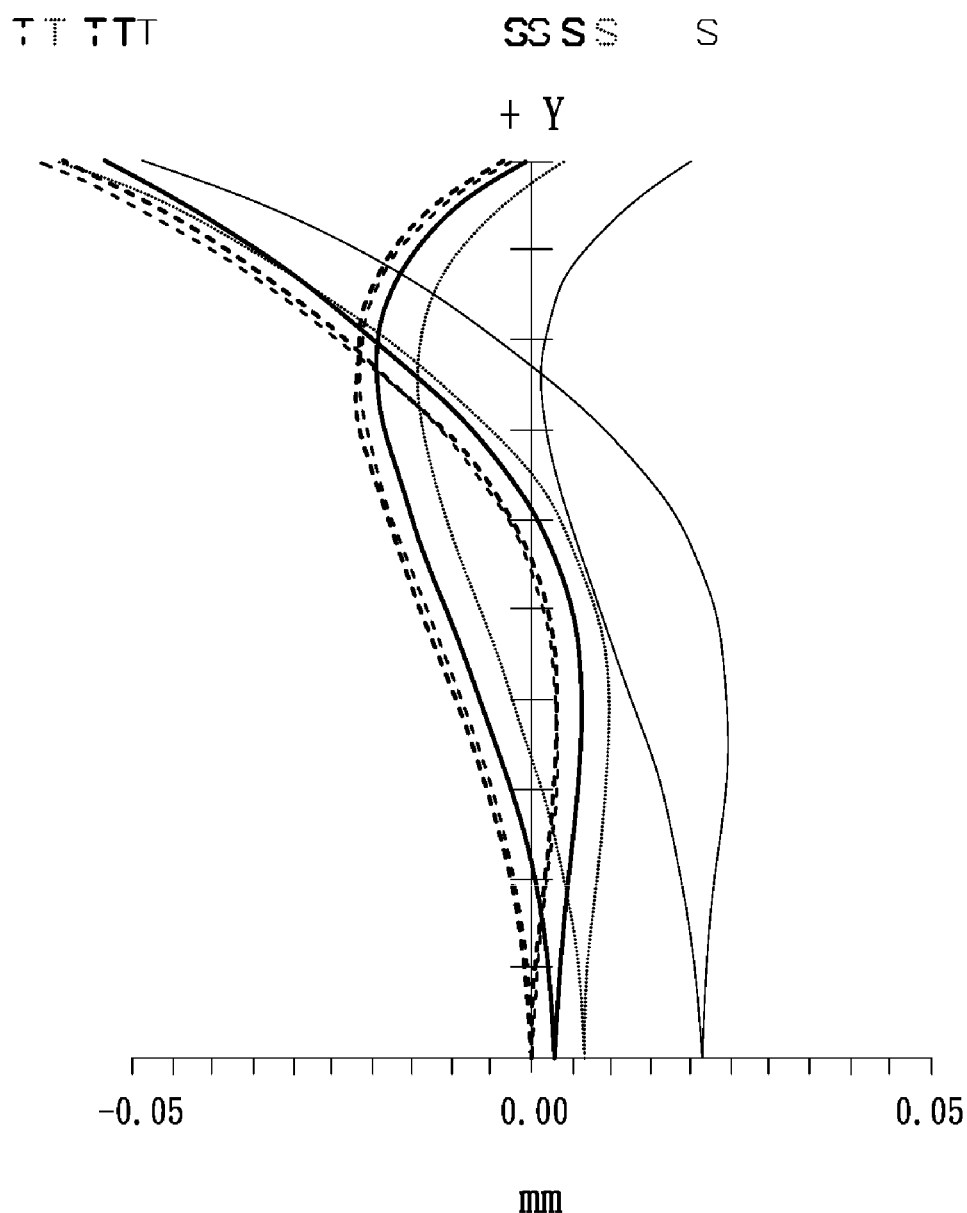
FIG. 4B is an astigmatic field curves of the telephoto lens assembly in accordance with the second embodiment of the invention.
Figure 4C:
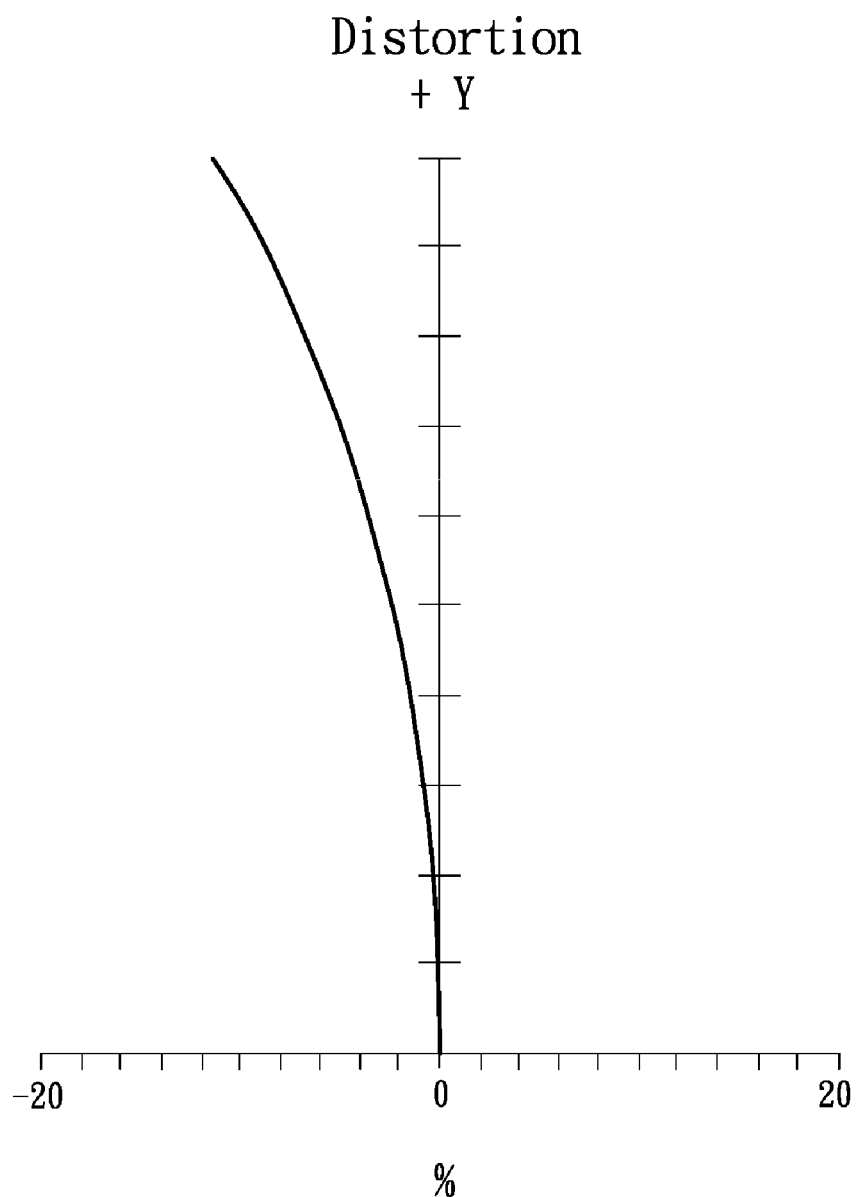
FIG. 4C is a distortion diagram of the telephoto lens assembly in accordance with the second embodiment of the invention.

By the above arrangements of the lenses and stop ST2, the telephoto lens assembly 2 of the second embodiment can meet the requirements of optical performance as seen in FIGS. 4A-4C, wherein FIG. 4A shows a longitudinal aberration diagram of the telephoto lens assembly 2 in accordance with the second embodiment of the invention, FIG. 4B shows an astigmatic field curves diagram of the telephoto lens assembly 2 in accordance with the second embodiment of the invention and FIG. 4C shows a distortion diagram of the telephoto lens assembly 2 in accordance with the second embodiment of the invention.

It can be seen from FIG. 4A that the longitudinal aberration in the telephoto lens assembly 2 of the second embodiment ranges from −0.005 mm to 0.025 mm for the wavelength of 0.470 μm, 0.510 μm, 0.555 μm, 0.610 μm and 0.650 μm.

It can be seen from FIG. 4B that the astigmatic field curves of tangential direction and sagittal direction in the telephoto lens assembly 2 of the second embodiment ranges between −0.065 mm and 0.025 mm for the wavelength of 0.470 μm, 0.510 μm, 0.555 μm, 0.610 μm and 0.650 μm.

It can be seen from FIG. 4C (in which the five lines in the figure almost coincide to appear as if a signal line) that the distortion in the telephoto lens assembly 2 of the second embodiment ranges between −12% and 0% for the wavelength of 0.470 μm, 0.510 μm, 0.555 μm, 0.610 μm and 0.650 μm.

It is obvious that the longitudinal aberration, astigmatic field curves and the distortion of the telephoto lens assembly 2 of the second embodiment can be corrected effectively. Therefore, the telephoto lens assembly 2 of the second embodiment is capable of good optical performance.

Figure 5:
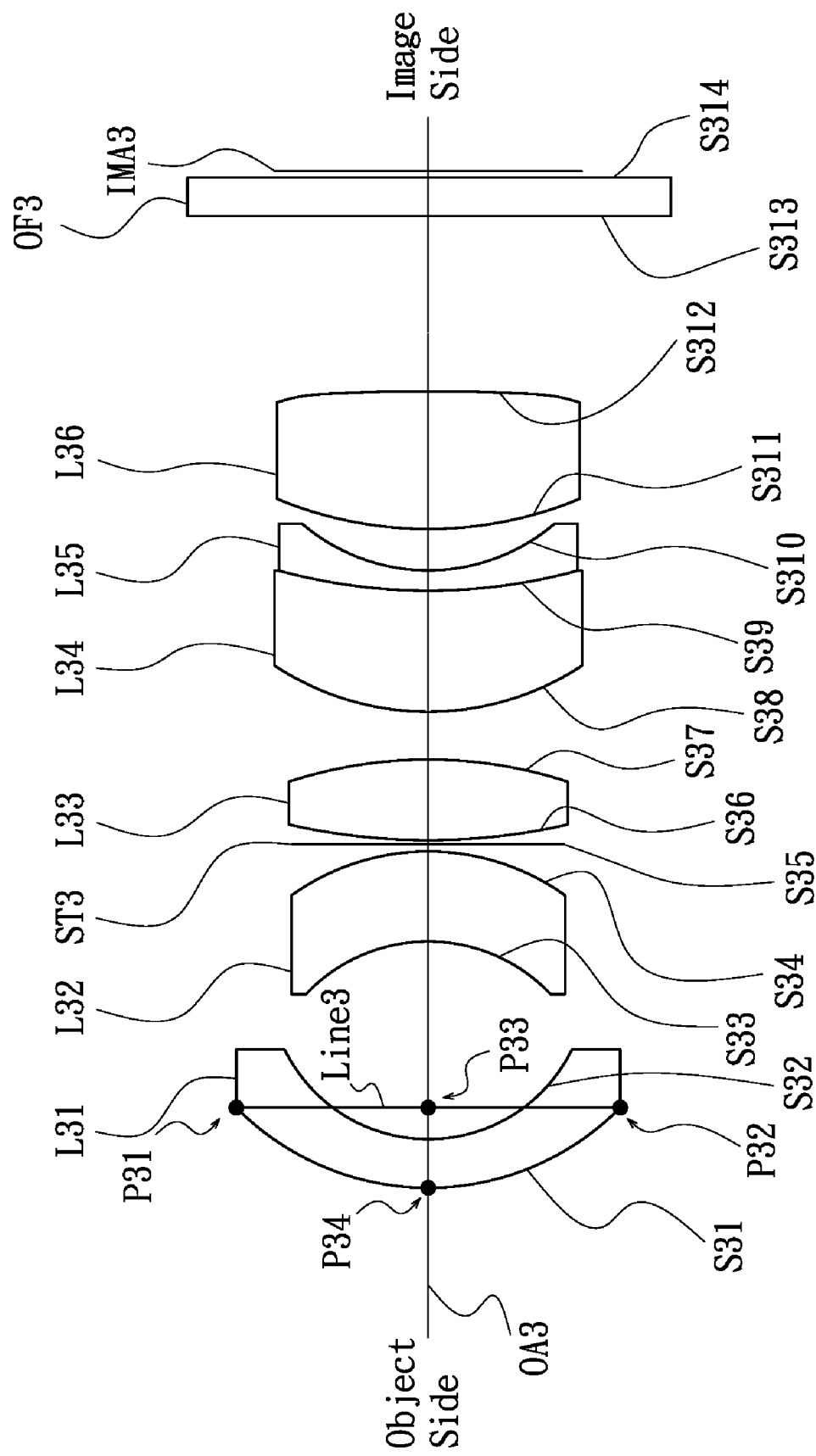
FIG. 5 is a lens layout and optical path diagram of a telephoto lens assembly in accordance with a third embodiment of the invention.

Referring to FIG. 5, FIG. 5 is a lens layout and optical path diagram of a telephoto lens assembly in accordance with a third embodiment of the invention. The telephoto lens assembly 3 includes a first lens L31, a second lens L32, a stop ST3, a third lens L33, a fourth lens L34, a fifth lens L35, a sixth lens L36 and an optical filter OF3, all of which are arranged in sequence from an object side to an image side along an optical axis OA3. In operation, an image of light rays from the object side is formed on an image plane IMA3.

The first lens L31 is a meniscus lens with negative refractive power. The first lens L31 is made of glass material, wherein the object side surface S31 is a convex surface, the image side surface S32 is a concave surface and both of the object side surface S31 and image side surface S32 are spherical surfaces.

The second lens L32 is a meniscus lens with negative refractive power. The second lens L32 is made of glass material, wherein the object side surface S33 is a concave surface, the image side surface S34 is a convex surface and both of the object side surface S33 and image side surface S34 are spherical surfaces.

The third lens L33 is a biconvex lens with positive refractive power. The third lens L33 is made of glass material, wherein the object side surface S36 is a convex surface, the image side surface S37 is a convex surface and both of the object side surface S36 and image side surface S37 are spherical surfaces.

The fourth lens L34 is a meniscus lens with positive refractive power. The fourth lens L34 is made of glass material, wherein the object side surface S38 is a convex surface, the image side surface S39 is a concave surface and both of the object side surface S38 and image side surface S39 are spherical surfaces.

The fifth lens L35 is a meniscus lens with negative refractive power. The fifth lens L35 is made of glass material, wherein the object side surface S39 is a convex surface, the image side surface S310 is a concave surface and both of the object side surface S39 and image side surface S310 are spherical surfaces.

The sixth lens L36 is a biconvex lens with positive refractive power. The sixth lens L36 is made of glass material, wherein the object side surface S311 is a convex surface, the image side surface S312 is a convex surface and both of the object side surface S311 and image side surface S312 are aspheric surfaces.

Both of the object side surface S313 and image side surface S314 of the optical filter OF3 are plane surfaces.

In addition, the telephoto lens assembly 3 of the third embodiment at least satisfies one of the following conditions:

$$-0.7 \text{ mm}^{-1} \leq 1/(Nd3_1 \times f3_1) + 1/(Nd3_2 \times f3_2) + 1/(Nd3_3 \times f3_3) + 1/(Nd3_4 \times f3_4) + 1/(Nd3_5 \times f3_5) + 1/(Nd3_6 \times f3_6) \leq 0.7 \text{ mm}^{-1} \quad (13)$$

$$0.4 \leq LR3_1/f3 \leq 0.8 \quad (14)$$

$$0.2 \leq f3/TTL3 \leq 0.45 \quad (15)$$

$$23 \leq Vd3_4 - Vd3_5 \leq 40 \quad (16)$$

$$|f3_4/f3_5| \geq 1.7 \quad (17)$$

$$0.05 < |d3_2/d3_1| < 1 \quad (18)$$

wherein $Nd3_1$ is an index of refraction of the first lens L31, $Nd3_2$ is an index of refraction of the second lens L32, $Nd3_3$ is an index of refraction of the third lens L33, $Nd3_4$ is an index of refraction of the fourth lens L34, $Nd3_5$ is an index of refraction of the fifth lens L35, $Nd3_6$ is an index of refraction of the sixth lens L36, $f3_1$ is an effective focal length of the first lens L31, $f3_2$ is an effective focal length of the second lens L32, $f3_3$ is an effective focal length of the third lens L33, $f3_4$ is an effective focal length of the fourth lens L34, $f3_5$ is an effective focal length of the fifth lens L35, $f3_6$ is an effective focal length of the sixth lens L36, f3 is an effective focal length of the telephoto lens assembly 3, $LR3_1$ a radius of the object-side surface of the first lens L31, TTL3 is total track length which is from the object side S31 of the first lens L31 to the image side IMA3 along an optical axis OA3, $Vd3_4$ is an Abbe number of the fourth lens L34, $Vd3_5$ is an Abbe number of the fifth lens L35, $d3_2$ is a distance from a cross point P33 to a center point P34 of object-side surface of the first lens L31, $d3_1$ is a distance from the cross point P33 to the image side IMA3 along the optical axis OA3, the cross point P33 is defined as the line of intersection formed between a line Line3 which is between two opposite engaging point P31, P32 of the first lens L31 and the optical axis OA3.

By the above design of the lenses and stop ST3, the telephoto lens assembly 3 is provided with characteristics of a short total track length, a small F number, a field brightness of the telephoto lens assembly can be increased and an aberration that can be corrected effectively.

The telephoto lens assembly 3 in accordance with the FIG. 5 is provided with the optical specifications shown in Table 7. Table 7 shows that the effective focal length is equal to 6.02 mm, F-number is equal to 1.692 and total lens length is equal to 20.7 mm for the telephoto lens assembly 3 of the third embodiment of the invention.

TABLE 7

Effective Focal Length = 6.02 mm
F-number = 1.692
Total Lens Length = 20.7 mm

| Surface Number | Radius of Curvature (mm) | Thickness (mm) | Nd | Vd | Remark |
|---|---|---|---|---|---|
| S31 | 5.65 | 1.002 | 1.54 | 69 | The First Lens L31 |

TABLE 7-continued

Effective Focal Length = 6.02 mm
F-number = 1.692
Total Lens Length = 20.7 mm

| Surface Number | Radius of Curvature (mm) | Thickness (mm) | Nd | Vd | Remark |
|---|---|---|---|---|---|
| S32 | 3.36 | 4.001 | | | |
| S33 | −3.60 | 1.879 | 1.92 | 32 | The Second Lens L32 |
| S34 | −4.89 | 0.101 | | | |
| S35 | ∞ | 0.093 | | | Stop ST3 |
| S36 | 12.43 | 1.645 | 1.53 | 76 | The Third Lens L33 |
| S37 | −9.72 | 0.982 | | | |
| S38 | 5.88 | 2.457 | 1.79 | 60 | The fourth lens L34 |
| S39 | 12.34 | 0.424 | 1.93 | 20 | The fifth lens L35 |
| S310 | 4.15 | 0.848 | | | |
| S311 | 6.79 | 2.800 | 1.69 | 54 | The sixth lens L36 |
| S312 | −50.74 | 3.569 | | | |
| S313 | ∞ | 0.8 | 1.52 | 54.5 | Optical Filter OF3 |
| S314 | ∞ | 0.1 | | | |

The aspheric surface sag z of each lens in table 7 can be calculated by the following formula:

$$z = ch^2/\{1+[1-(k+1)c^2h^2]^{1/2}\}+Ah^4+Bh^6+Ch^8+Dh^{10}$$

where c is curvature, h is the vertical distance from the lens surface to the optical axis, k is conic constant and A, B, C and D are aspheric coefficients.

In the third embodiment, the conic constant k and the aspheric coefficients A, B, C, D of each surface are shown in Table 8.

TABLE 8

| Surface Number | k | A | B | C | D |
|---|---|---|---|---|---|
| S311 | −0.215 | −3.973E−04 | −2.314E−05 | −1.254E−05 | 3.389E−07 |
| S312 | −170 | 6.884E−06 | −1.018E−04 | −2.688E−06 | −2.030E−07 |

Table 9 lists some parameter and calculated values of the above condition (13)-(18). According to the Table 9, the telephoto lens assembly 3 of the third embodiment satisfies the above conditions (13)-(18).

TABLE 9

| | | | | | |
|---|---|---|---|---|---|
| $f3_1$ | −18.097 mm | $f3_2$ | −48.834 mm | $f3_3$ | 10.543 mm |
| $f3_4$ | 12.144 mm | $f3_5$ | −6.854 mm | $f3_6$ | 8.827 mm |
| f3 | 6.02 mm | TTL3 | 20.7 mm | $Nd3_1$ | 1.54 |
| $Nd3_2$ | 1.92 | $Nd3_3$ | 1.53 | $Nd3_4$ | 1.79 |
| $Nd3_5$ | 1.93 | $Nd3_6$ | 1.69 | $LR3_1$ | 4 mm |
| $Vd3_4$ | 60 | $Vd3_5$ | 20 | $d3_1$ | 19.319 mm |
| $d3_2$ | 1.385 mm | | | | |
| $1/(Nd3_1 \times f3_1) + 1/(Nd3_2 \times f3_2) + 1/(Nd3_3 \times f3_3) + 1/(Nd3_4 \times f3_4) + 1/(Nd3_5 \times f3_5) + 1/(Nd3_6 \times f3_6)$ | | | | | 0.053 mm$^{-1}$ |
| $LR3_1/f3$ | 0.66 | f3/TTL3 | 0.291 | $Vd3_4 − Vd3_5$ | 40 |
| $|f3_4/f3_5|$ | 1.772 | $|d3_2/d3_1|$ | 0.072 | | |

In the third embodiment, the fourth lens L34 and the fifth lens L35 are cemented together to form a cemented lens. A composite focal length of the cemented lens is −30.718 mm. The cemented lens has negative refractive power and includes a convex surface facing the object side and a concave surface facing the image side. The cemented lens of the fourth lens L34 with positive refractive power and the fifth lens L35 with negative refractive power can effectively correct chromatic aberration and is of benefit to get a balance between reduce aberration and short total track length. Furthermore, the tolerance sensitivity of the cemented lens is not affected by air space between the lenses. The cemented is of benefit to enhance the environmental resistance ability and optical performance stability of the telephoto lens assembly.

Figure 6A:
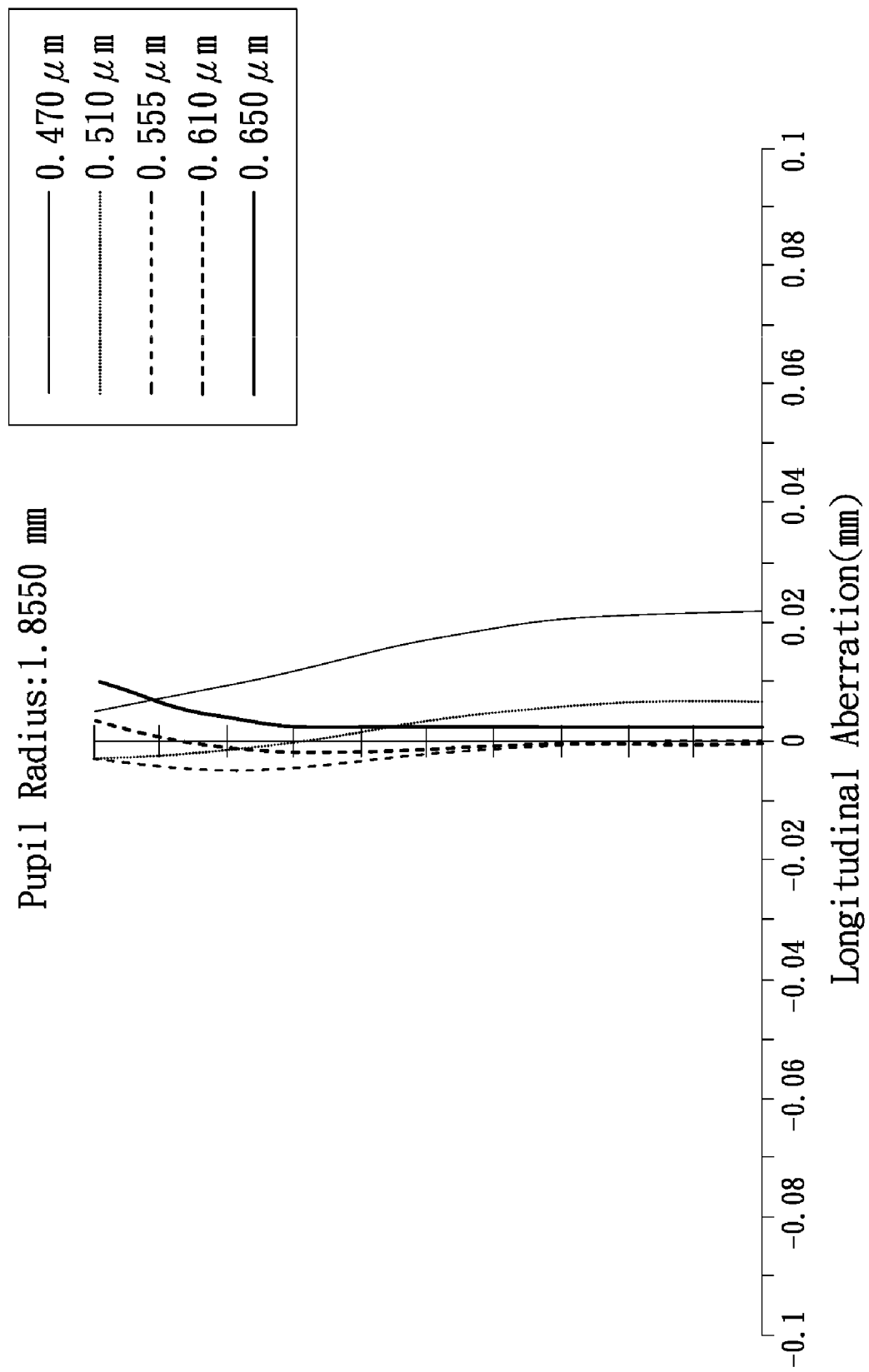
FIG. 6A is a longitudinal spherical aberration diagram of the telephoto lens assembly in accordance with the third embodiment of the invention.
Figure 6B:
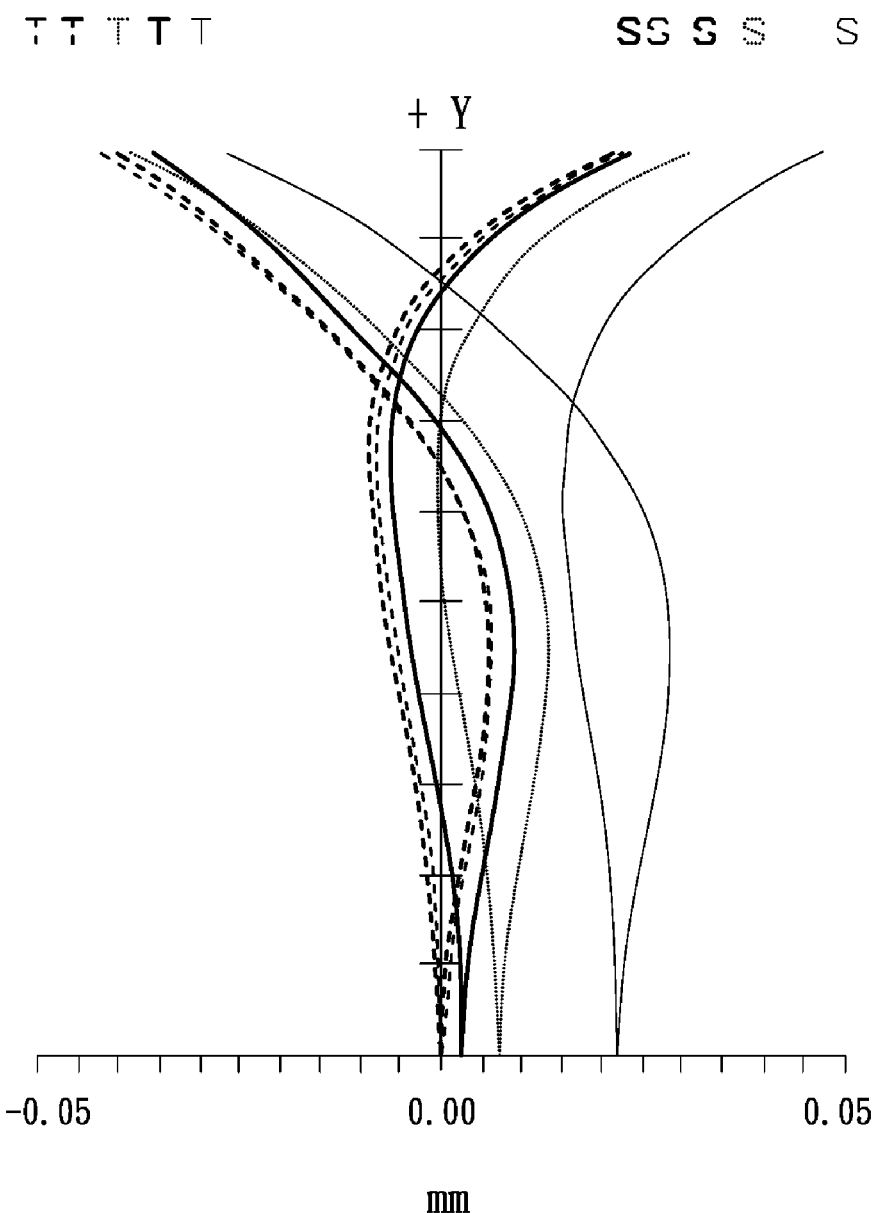
FIG. 6B is an astigmatic field curves of the telephoto lens assembly in accordance with the third embodiment of the invention.
Figure 6C:
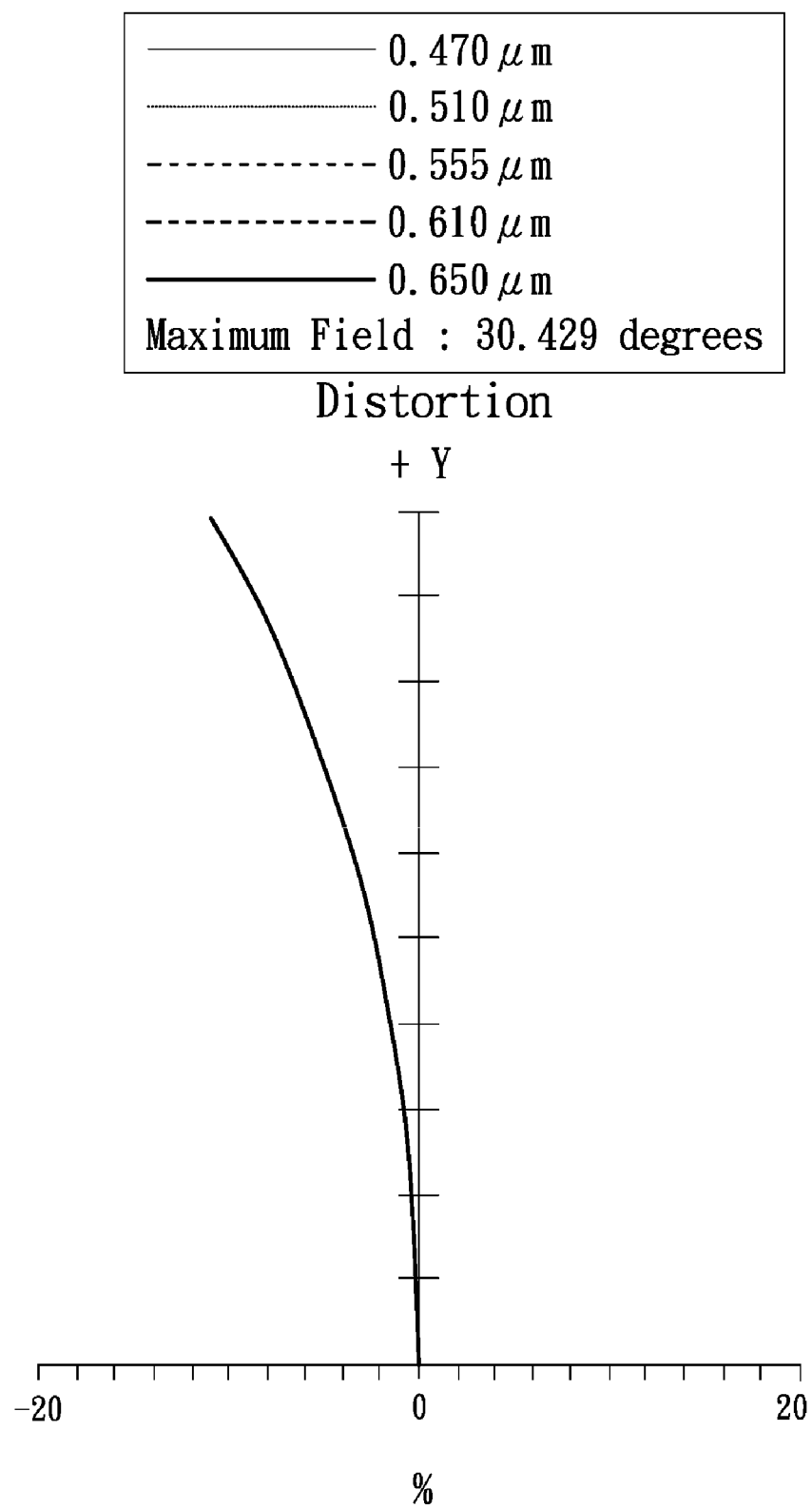
FIG. 6C is a distortion diagram of the telephoto lens assembly in accordance with the third embodiment of the invention.

By the above arrangements of the lenses and stop ST3, the telephoto lens assembly 3 of the third embodiment can meet the requirements of optical performance as seen in FIGS. 6A-6C, wherein FIG. 6A shows a longitudinal aberration diagram of the telephoto lens assembly 3 in accordance with the third embodiment of the invention, FIG. 6B shows an astigmatic field curves diagram of the telephoto lens assembly 3 in accordance with the third embodiment of the invention and FIG. 6C shows a distortion diagram of the telephoto lens assembly 3 in accordance with the third embodiment of the invention.

It can be seen from FIG. 6A that the longitudinal aberration in the telephoto lens assembly 3 of the third embodiment ranges from −0.005 mm to 0.025 mm for the wavelength of 0.470 μm, 0.510 μm, 0.555 μm, 0.610 μm and 0.650 μm.

It can be seen from FIG. 6B that the astigmatic field curves of tangential direction and sagittal direction in the telephoto lens assembly 3 of the third embodiment ranges between −0.045 mm and 0.05 mm for the wavelength of 0.470 μm, 0.510 μm, 0.555 μm, 0.610 μm and 0.650 μm.

It can be seen from FIG. 6C (in which the five lines in the figure almost coincide to appear as if a signal line) that the distortion in the telephoto lens assembly 3 of the third embodiment ranges between −12% and 0% for the wavelength of 0.470 μm, 0.510 μm, 0.555 μm, 0.610 μm and 0.650 μm.

It is obvious that the longitudinal aberration, astigmatic field curves and the distortion of the telephoto lens assembly 3 of the third embodiment can be corrected effectively. Therefore, the telephoto lens assembly 3 of the third embodiment is capable of good optical performance.

What is claimed is:

1. A telephoto lens assembly, consisting of sequentially from an object side to an image side along an optical axis:
   a first lens which is a meniscus lens with negative refractive power;
   a second lens which is a meniscus lens with negative refractive power;
   a stop;
   a third lens with positive refractive power;
   a fourth lens with positive refractive power;
   a fifth lens with refractive power; and
   a sixth lens with positive refractive power;
   wherein the fourth lens and the fifth lens are cemented to form a cemented lens.

2. A telephoto lens assembly, comprising sequentially from an object side to an image side along an optical axis:
   a first lens which is a meniscus lens with negative refractive power;
   a second lens which is a meniscus lens with negative refractive power;
   a stop;
   a third lens with positive refractive power;
   a fourth lens with positive refractive power, which includes a concave surface facing the image side;
   a fifth lens with negative refractive power, which includes a convex surface facing the object side; and
   a sixth lens with positive refractive power.

3. The telephoto lens assembly as claimed in claim 1, wherein the first lens includes a convex surface facing the object side and a concave surface facing the image side, the second lens includes a concave surface facing the object side and a convex surface facing the image side, the fourth lens includes a concave surface facing the image side, and the fifth lens with negative refractive power includes a convex surface facing the object side.

4. The telephoto lens assembly as claimed in claim 2, wherein the first lens includes a convex surface facing the object side and a concave surface facing the image side, the second lens includes a concave surface facing the object side and a convex surface facing the image side.

5. The telephoto lens assembly as claimed in claim 3, wherein the telephoto lens assembly satisfies:

$$-0.7 \text{ mm}^{-1} \leq 1/(Nd_1 \times f_1) + 1/(Nd_2 \times f_2) + 1/(Nd_3 \times f_3) + 1/(Nd_4 \times f_4) + 1/(Nd_5 \times f_5) + 1/(Nd_6 \times f_6) \leq 0.7 \text{ mm}^{-1}$$

wherein $Nd_1$ is an index of refraction of the first lens, $Nd_2$ is an index of refraction of the second lens, $Nd_3$ is an index of refraction of the third lens, $Nd_4$ is an index of refraction of the fourth lens, $Nd_5$ is an index of refraction of the fifth lens, $Nd_6$ is an index of refraction of the sixth lens, $f_1$ is an effective focal length of the first lens, $f_2$ is an effective focal length of the second lens, $f_3$ is an effective focal length of the third lens, $f_4$ is an effective focal length of the fourth lens, $f_5$ is an effective focal length of the fifth lens, $f_6$ is an effective focal length of the sixth lens.

6. The telephoto lens assembly as claimed in claim 4, wherein the telephoto lens assembly satisfies:

$$-0.7 \text{ mm}^{-1} \leq 1/(Nd_1 \times f_1) + 1/(Nd_2 \times f_2) + 1/(Nd_3 \times f_3) + 1/(Nd_4 \times f_4) + 1/(Nd_5 \times f_5) + 1/(Nd_6 \times f_6) \leq 0.7 \text{ mm}^{-1}$$

wherein $Nd_1$ is an index of refraction of the first lens, $Nd_2$ is an index of refraction of the second lens, $Nd_3$ is an index of refraction of the third lens, $Nd_4$ is an index of refraction of the fourth lens, $Nd_5$ is an index of refraction of the fifth lens, $Nd_6$ is an index of refraction of the sixth lens, $f_1$ is an effective focal length of the first lens, $f_2$ is an effective focal length of the second lens, $f_3$ is an effective focal length of the third lens, $f_4$ is an effective focal length of the fourth lens, $f_5$ is an effective focal length of the fifth lens, $f_6$ is an effective focal length of the sixth lens.

7. The telephoto lens assembly as claimed in claim 3, wherein the telephoto lens assembly satisfies:

$$0.4 \leq LR_1/f_1 \leq 0.8$$

wherein LR1 a radius of the object-side surface of the first lens, f is an effective focal length of the telephoto lens assembly.

8. The telephoto lens assembly as claimed in claim 4, wherein the telephoto lens assembly satisfies:

$$0.4 \leq LR_1/f_1 \leq 0.8$$

wherein LR1 a radius of the object-side surface of the first lens, f is an effective focal length of the telephoto lens assembly.

9. The telephoto lens assembly as claimed in claim 7, wherein the telephoto lens assembly satisfies:

$$0.2 \leq f/TTL1 \leq 0.45$$

wherein f is an effective focal length of the telephoto lens assembly and TTL is total track length which is from the object side of the first lens to the image side along an optical axis.

10. The telephoto lens assembly as claimed in claim 8, wherein the telephoto lens assembly satisfies:

$$0.2 \leq f/TTL1 \leq 0.45$$

wherein f is an effective focal length of the telephoto lens assembly and TTL is total track length which is from the object side of the first lens to the image side along an optical axis.

11. The telephoto lens assembly as claimed in claim 3, wherein the telephoto lens assembly satisfies:

$$23 \leq Vd_4 - Vd_5 \leq 40$$

wherein $Vd_4$ is an Abbe number of the fourth lens and $Vd_5$ is an Abbe number of the fifth lens.

12. The telephoto lens assembly as claimed in claim 4, wherein the telephoto lens assembly satisfies:

$$23 \leq Vd_4 - Vd_5 \leq 40$$

wherein $Vd_4$ is an Abbe number of the fourth lens and $Vd_5$ is an Abbe number of the fifth lens.

13. The telephoto lens assembly as claimed in claim 11, wherein the telephoto lens assembly satisfies:

$$|f_4/f_5| \geq 1.7$$

wherein $f_4$ is an effective focal length of the fourth lens and $f_5$ is an effective focal length of the fifth lens.

14. The telephoto lens assembly as claimed in claim 12, wherein the telephoto lens assembly satisfies:

$$|f_4/f_5| \geq 1.7$$

wherein $f_4$ is an effective focal length of the fourth lens and $f_5$ is an effective focal length of the fifth lens.

15. The telephoto lens assembly as claimed in claim 3, wherein the telephoto lens assembly satisfies:

$$0.05 < |d_2/d_1| < 1$$

wherein $d_2$ is a distance from a cross point to a center point of object-side surface of the first lens, $d_1$ is a distance from the cross point to the image side along the optical axis, the cross point is defined as the line of intersection formed between a line which is between two opposite engaging point of the first lens and the optical axis.

16. The telephoto lens assembly as claimed in claim 4, wherein the telephoto lens assembly satisfies:

$$0.05 < |d_2/d_1| < 1$$

wherein $d_2$ is a distance from a cross point to a center point of object-side surface of the first lens, $d_1$ is a distance from the cross point to the image side along the optical axis, the cross point is defined as the line of intersection formed between two opposite engaging point of the first lens and the optical axis.

17. The telephoto lens assembly as claimed in claim 3, wherein the first lens is made of glass material, the second lens is made of glass material, the third lens is made of glass material, the fourth lens is made of glass material, the fifth lens is made of glass material, the sixth lens is made of glass material and the sixth lens is an aspheric lens.

18. The telephoto lens assembly as claimed in claim 4, wherein the first lens is made of glass material, the second lens is made of glass material, the third lens is made of glass material, the fourth lens is made of glass material, the fifth lens is made of glass material, the sixth lens is made of glass material and the sixth lens is an aspheric lens.

19. A telephoto lens assembly, comprising sequentially from an object side to an image side along an optical axis:
   a first lens which is a meniscus lens with negative refractive power;
   a second lens which is a meniscus lens with negative refractive power;
   a stop;
   a third lens with positive refractive power;
   a fourth lens with refractive power;
   a fifth lens with negative refractive power; and
   a sixth lens with positive refractive power;
   wherein the fourth lens and the fifth lens are cemented to form a cemented lens;
   wherein the telephoto lens assembly satisfies:

$$|f_4/f_5| \geq 1.7$$

wherein $f_4$ is an effective focal length of the fourth lens and $f_5$ is an effective focal length of the fifth lens.

* * * * *